Patented Nov. 7, 1922.

1,434,837

UNITED STATES PATENT OFFICE.

ELLSBERRY NEWBY, OF FRESNO, CALIFORNIA.

PROCESS OF TREATING DRIED FIGS.

No Drawing.   Application filed February 8, 1921.   Serial No. 443,350.

*To all whom it may concern:*

Be it known that I, ELLSBERRY NEWBY, a citizen of the United States, residing at Fresno, in the county of Fresno and State of California, have invented certain new and useful Improvements in Processes of Treating Dried Figs; and I do hereby declare the following to be a full, clear, and exact description of the invention, such as will enable others skilled in the art to which it appertains to make and use the same.

The invention relates to the treatment of dried figs whereby the flavor is rendered more delicate and the skin softened and made tender.

In accordance with the invention, the dried figs are subjected to a bath consisting of the following ingredients in about the proportions specified, namely:

Water _____ 1 gal.
Common table salt _____ 4 oz.
Glycerine _____ 1 oz.
Lemon or lime juice _____ 1½ oz.
Cream of tartar _____ ¼ oz.

The salt, glycerine, fruit juice and cream of tartar are added to the water and the mixture thoroughly stirred and heated to the boiling point. The dried figs are immersed in the boiling solution for about four minutes and are then removed and packed for market. The solution is maintained at the boiling point during the immersion of the figs therein.

Orange juice may be substituted for the lemon or lime juice. Four ounces of orange juice are required when substituted for the lemon or lime juice in the formula herein given. The glycerine softens the skin of the dried figs and renders the fruit more tender and palatable. The lemon juice or its equivalent assists materially in softening the skin of the figs and imparts a more delicate and agreeable flavor thereto. The cream of tartar prevents sugaring.

Dried figs treated in accordance with the process herein stated are rendered tender and a more delicate and agreeable flavor is imparted thereto and the figs when packed for market are prevented from sugaring and do not harden or become tough.

What is claimed is:

The process of treating dried figs which consists of subjecting the fruit for a period of about four minutes to a bath maintained at approximately the boiling point and consisting of water to which has been added common table salt, glycerine, the juice of lemon, or its equivalent, and cream of tartar in about the proportions specified.

In testimony whereof I affix my signature in presence of two witnesses.

ELLSBERRY NEWBY.

Witnesses:
  WARNER NEWBY,
  C. K. HAMILTON.